(12) United States Patent
Wang et al.

(10) Patent No.: US 11,431,915 B2
(45) Date of Patent: Aug. 30, 2022

(54) IMAGE ACQUISITION METHOD, ELECTRONIC DEVICE, AND NON-TRANSITORY COMPUTER READABLE STORAGE MEDIUM

(71) Applicant: GUANGDONG OPPO MOBILE TELECOMMUNICATIONS CORP., LTD., Guangdong (CN)

(72) Inventors: Huichao Wang, Guangdong (CN); Gong Zhang, Guangdong (CN)

(73) Assignee: GUANGDONG OPPO MOBILE TELECOMMUNICATIONS CORP., LTD.

( * ) Notice: Subject to any disclaimer, the term of this patent is extended or adjusted under 35 U.S.C. 154(b) by 0 days.

(21) Appl. No.: 17/373,729

(22) Filed: Jul. 12, 2021

(65) Prior Publication Data

US 2021/0344826 A1 Nov. 4, 2021

Related U.S. Application Data

(63) Continuation of application No. PCT/CN2020/075005, filed on Feb. 13, 2020.

(30) Foreign Application Priority Data

Feb. 18, 2019 (CN) .......................... 201910119702.4

(51) Int. Cl.
*H04N 5/235* (2006.01)

(52) U.S. Cl.
CPC ......... *H04N 5/2352* (2013.01); *H04N 5/2351* (2013.01); *H04N 5/2355* (2013.01)

(58) Field of Classification Search
CPC ... H04N 5/2352; H04N 5/2351; H04N 5/2355
See application file for complete search history.

(56) References Cited

U.S. PATENT DOCUMENTS

| 9,894,285 B1 | 2/2018 | Chen et al. |
| 2014/0071330 A1 | 3/2014 | Zhang |

(Continued)

FOREIGN PATENT DOCUMENTS

| CN | 102081275 A | 6/2011 |
| CN | 103702015 A | 4/2014 |

(Continued)

OTHER PUBLICATIONS

The1st Office Action, dated Mar. 4, 2020, from China Application No. 201910119702.4, 22 pages.

(Continued)

*Primary Examiner* — Ahmed A Berhan
(74) *Attorney, Agent, or Firm* — Adsero IP

(57) ABSTRACT

An image acquisition, an electronic device, and a non-transitory computer-readable storage medium are provided. The image acquisition method includes: acquiring, by a first camera, at least two first images by using at least two different first exposure parameters; performing a content analysis on each of the first images, and determining at least two second exposure parameters according to an content analysis result and the at least two different first exposure parameters; performing an image acquisition, by a second camera, with the at least two second exposure parameters to acquire at least two second images; and performing a fusion process on the at least two second images to obtain a target image.

18 Claims, 13 Drawing Sheets

(56) References Cited

U.S. PATENT DOCUMENTS

| | | | |
|---|---|---|---|
| 2015/0036020 A1 | 2/2015 | Shehane et al. | |
| 2015/0229889 A1* | 8/2015 | Boettiger | H04N 5/23222 348/262 |
| 2016/0227100 A1* | 8/2016 | Liu | H04N 5/23248 |
| 2018/0063583 A1 | 3/2018 | Sheppard et al. | |
| 2019/0052802 A1 | 2/2019 | Huang | |

FOREIGN PATENT DOCUMENTS

| | | |
|---|---|---|
| CN | 104301622 A | 1/2015 |
| CN | 104937921 A | 9/2015 |
| CN | 107395998 A | 11/2017 |
| CN | 108156369 A | 6/2018 |
| CN | 108234880 A | 6/2018 |
| CN | 108337445 A | 7/2018 |
| CN | 108337446 A | 7/2018 |
| CN | 108769542 A | 11/2018 |
| CN | 109862269 A | 6/2019 |
| CN | 110049240 A | 7/2019 |
| CN | 110225248 A | 9/2019 |

OTHER PUBLICATIONS

Notification to Grant Patent Right for Invention, dated Jun. 16, 2020, from China Application No. 201910119702.4, 6 pages.
International Search Report and the Written Opinion, dated May 9, 2020, from the International Searching Authority, International Application No. PCT/CN2020/075005, 13 pages.
European Search report from Application No. 20758663.7 dated Feb. 24, 2022.

* cited by examiner

IMAGE ACQUISITION METHOD, ELECTRONIC DEVICE, AND NON-TRANSITORY COMPUTER READABLE STORAGE MEDIUM

CROSS REFERENCE TO RELATED APPLICATIONS

This application is a continuation of International Application No. PCT/CN2020/075005, filed on Feb. 13, 2020, which claims priority of a Chinese patent application No. 201910119702.4 filed on Feb. 18, 2019, both of which are hereby incorporated by reference.

FIELD OF DISCLOSURE

The present disclosure relates to the field of imaging technologies, in particular to an image acquisition method, an electronic device, and a non-transitory computer-readable storage medium.

BACKGROUND

Since a brightness range that human eyes can perceive is much larger than a brightness range provided by display screens and cameras, a brightness of a photographed object perceived by the human eyes is significantly different from a brightness of an image acquired by the camera. At present, in an image acquisition process, the camera can acquire a plurality of images with a plurality of preset exposure parameters, to synthesize high-dynamic range (HDR) images based on the plurality of images. However, the quality of the synthesized HDR images is low.

SUMMARY OF DISCLOSURE

According to a plurality of embodiments of the present disclosure, an image acquisition method, an electronic device, and a non-transitory computer-readable storage medium are provided.

An image acquisition method includes:
acquiring, by a first camera, at least two first images by using at least two different first exposure parameters;
performing a content analysis on each of the first images, and determining at least two second exposure parameters according to an obtained content analysis result and the at least two different first exposure parameters;
performing an image acquisition, by a second camera, with the at least two second exposure parameters to acquire at least two second images; and
performing a fusion process on the at least two second images to obtain a target image.

An electronic device includes a storage and a processor. The storage stores a computer program, and in respond to the computer program is executed by the processor, the processor is caused to perform following operations:
acquiring, by a first camera, at least two first images by using at least two different first exposure parameters;
performing a content analysis on each of the first images, and determining at least two second exposure parameters according to an obtained content analysis result and the at least two different first exposure parameters;
performing an image acquisition, by a second camera, with the at least two second exposure parameters to acquire at least two second images; and
performing a fusion process on the at least two second images to obtain a target image.

A non-transitory computer-readable storage medium storing a computer program for execution by at least one processor of an electronic device, the computer program including sets of instructions for:
acquiring, by a first camera, at least two first images by using at least two different first exposure parameters;
performing a content analysis on each of the first images, and determining at least two second exposure parameters according to an obtained content analysis result and the at least two different first exposure parameters;
performing an image acquisition, by a second camera, with the at least two second exposure parameters to acquire at least two second images; and
performing a fusion process on the at least two second images to obtain a target image.

In the image acquisition method, the electronic device, and the non-transitory computer-readable storage medium of the embodiments of the present disclosure, according to an analysis of the plurality of images acquired by the first camera, the exposure parameters of the images used for the fusion process are obtained, and the second camera acquires the images according to the exposure parameters and then performs the fusion process, which can improve the quality of the acquired images.

Details of one or more embodiments of the present disclosure are set forth in the following drawings and description. Other features, objects, and advantages of the present disclosure will become apparent from the description, drawings, and claims.

BRIEF DESCRIPTION OF DRAWINGS

In order to more clearly describe the embodiments of the present disclosure or the technical solutions in the prior art, the following will briefly introduce the drawings that need to be used in the description of the embodiments or the prior art. Apparently, the drawings in the following description are only some embodiments of the present disclosure. For those of ordinary skill in the art, other drawings can be obtained based on these drawings without creative efforts.

DETAILED DESCRIPTION

In order to make purposes, technical solutions, and advantages of the present disclosure clearer, the present disclosure is described in further detail below with reference to the accompanying drawings and embodiments. It should be understood that the specific embodiments described herein are only used to explain the present disclosure, and are not used to limit the present disclosure.

It can be understood that terms, such as "first", "second", etc., used in the present disclosure can be used herein to describe various elements, but these elements are not limited by these terms. These terms are only used to distinguish the first element from another element. For example, without departing from a scope of the present disclosure, a first camera may be referred to as a second camera. Similarly, the second camera may be referred to as the first camera. Both the first camera and the second camera are cameras, but they are not the same camera.

Figure 1:
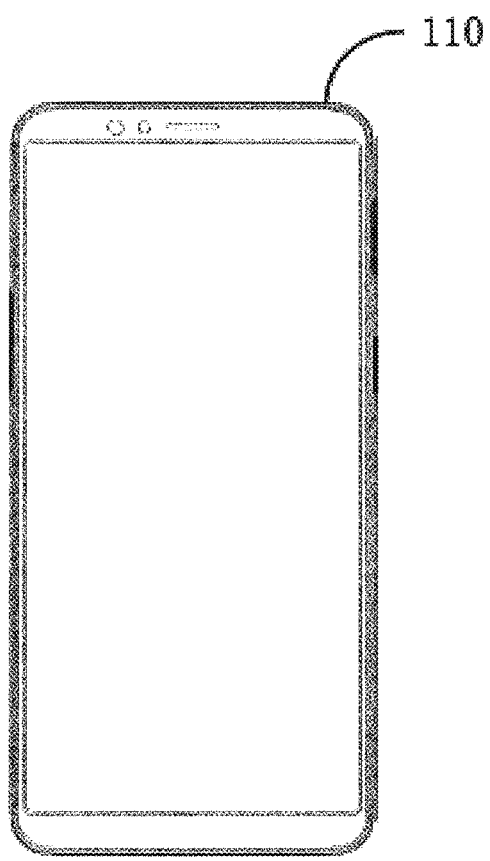
FIG. 1 illustrates a schematic diagram of an application environment of an image acquisition method in one or more embodiments.

FIG. 1 illustrates a schematic diagram of an application environment of an image acquisition method in one embodiment. As illustrated in FIG. 1, the application environment includes an electronic device 110. The electronic device 110 can be configured to acquire, by a first camera, at least two first images by using at least two different first exposure parameters, perform a content analysis on each of the first images, determine at least two second exposure parameters according to an obtained content analysis result and the at least two different first exposure parameters, perform an image acquisition, by a second camera, with the at least two second exposure parameters to acquire at least two second images, and perform a fusion process on the at least two second images to obtain a target image. It can be understood that the above-mentioned electronic device 110 may be, but not limited to, various mobile phones, computers, portable devices, and the like.

Figure 2:
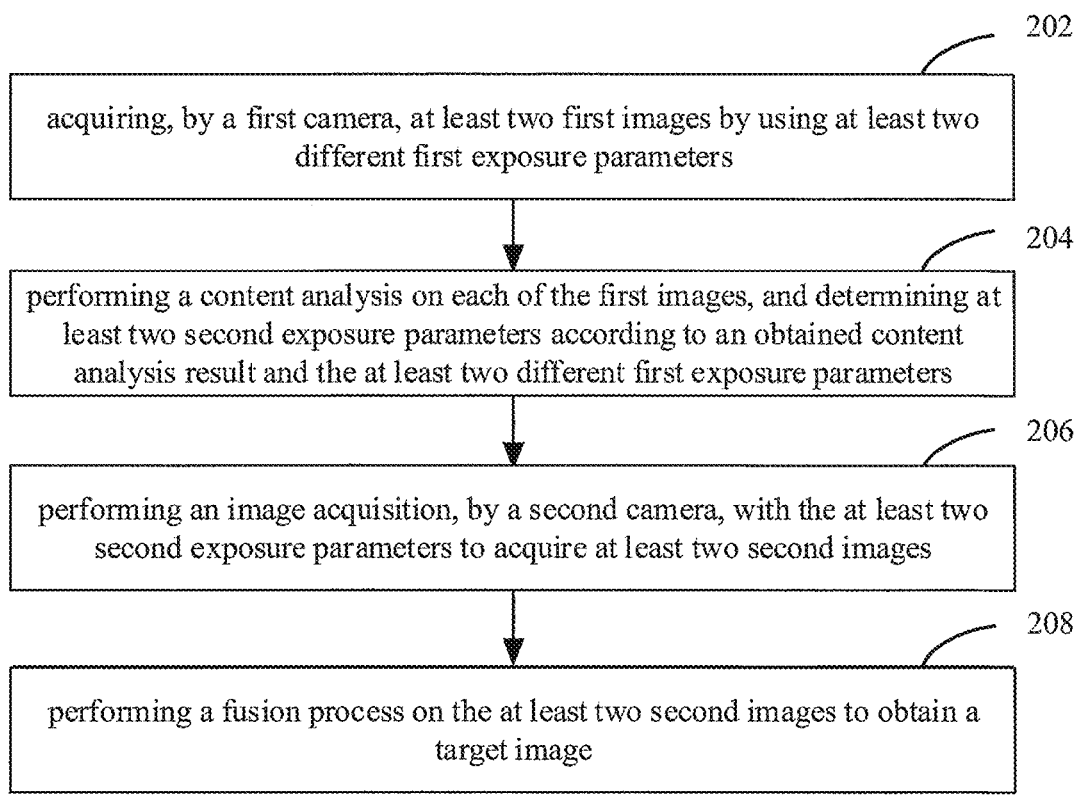
FIG. 2 illustrates a flowchart of an image acquisition method in one or more embodiments.

FIG. 2 illustrates a flowchart of an image acquisition method in one embodiment. As illustrated in FIG. 2, the image acquisition method includes operations 202 to 208.

In an operation 202, a first camera acquires at least two first images by using at least two different first exposure parameters.

An electronic device includes the first camera and a second camera. The first camera and the second camera are set on a same side of the electronic device and can be configured to acquire images containing a same object. Specifically, the first camera and the second camera may be, but not limited to, any one or two of a color camera, a black-and-white camera, a wide-angle camera, and a telephoto camera. The exposure parameters include an exposure time. The exposure time is a time range from opening to closing of a shutter when the camera is acquiring the images. Alternatively, in some embodiments, the exposure parameters also include a camera gain and the like. Generally, when the exposure time is small, a higher camera gain can be used. In a case of a longer exposure time, a smaller camera gain can be used.

The electronic device can preset a plurality of different first exposure parameters according to actual application requirements, and a number and specific values of the exposure parameters are not limited here. The plurality of images acquired by the camera according to the at least two different first exposure parameters may contain information of a bright area and a dark area of a shot scene. For example, the different first exposure parameters may be 0.001 s, 0.002 s, 0.01 s, 0.05 s, 0.1 s, etc., but it is not limited thereto. The electronic device can acquire the at least two first images corresponding to the at least two different first exposure parameters through the first camera, and one of the first exposure parameters corresponds to one of the first images. The at least two first images acquired by the electronic device have the same or approximately the same shot scene, and an amount of image information contained is different.

In an operation 204, a content analysis is performed on each of the first images, and at least two second exposure parameters are determined according to an obtained content analysis result and the at least two different first exposure parameters.

The content analysis of the image may include, but is not limited to, analysis of brightness information, color information, image complexity, and information distribution of the image. A number of the second exposure parameters can be preset according to actual application requirements, and is not limited here. For example, the electronic device can preset the number of second exposure parameters to 2, 3, or 4, etc. Generally, the number of second exposure parameters is less than or equal to a number of first exposure parameters. At least two images acquired according to the at least two exposure parameters contain the most information about a real scene being photographed. An image after performing a fusion process on the at least two images acquired according to the at least two exposure parameters can reflect a real visual effect of the photographed scene. Alternatively, the number of second exposure parameters can also be determined according to the content analysis result of the first image. For example, if it is determined according to the content analysis result of each first image that only two second exposure parameters are needed to obtain all the information of the real shot scene, the number of second exposure parameters can be two.

The electronic device can perform the content analysis on each of the first images, thereby obtaining the content analysis result corresponding to each of the first images (i.e., each of first exposure parameters). According to the content analysis result, at least two second exposure parameters that can obtain all the information of the real shot scene are determined. Specifically, the electronic device performs the content analysis on each of the first images, and a distribution of image information under different exposure parameters can be obtained. In combination with brightness distribution information of each of the first images, the electronic device can determine the at least two second exposure parameters that can obtain all the information of the real shot scene. For example, if the shooting scene is a set of light bands with increasing distribution from black to white, the electronic device adopts at least two different first exposure parameters (e.g., the exposure time is 0.005 s, 0.01 s, 0.04 s, 0.08 s, 0.1 s). In the corresponding acquired plurality of first images, the first image corresponding to a lower exposure time (i.e., 0.005 s) may contain image information corresponding to a white light bulb. Moreover, a black light bulb is displayed as a black color in the first image due to insufficient input light, which cannot reflect details of the black light bulb. The first image corresponding to a higher exposure time (i.e., 0.1 s) may contain image information of the black light bulb. Moreover, the white light bulb will be displayed as a white color, which cannot reflect details of the white light bulb. Thus, the electronic device can perform the content analysis on each of the first images. According to the content analysis result and the at least two different first exposure parameters, the at least two second exposure parameters that can obtain all the information of the light bands are determined.

In an operation 206, the second camera performs an image acquisition with the at least two second exposure parameters to acquire at least two second images.

After the electronic device obtains the at least two second exposure parameters by analyzing the at least two first images acquired by the first camera, the second camera can perform the image acquisition with the at least two second exposure parameters to acquire the corresponding at least two second images. A number of the second images is the same as a number of the second exposure parameters. That is, one of the second exposure parameters corresponds to one of the second images.

Alternatively, when receiving an image acquisition instruction, the electronic device can control the second camera to perform the image acquisition with the at least two second exposure parameters. At this time, the electronic device can perform the image acquisition according to the latest at least two second exposure parameters to acquire the corresponding at least two second images.

In an operation 208, a fusion process is performed on the at least two second images to obtain a target image.

The fusion process refers to an operation of generating a final image from the plurality of images according to certain rules. The electronic device can perform the fusion process on the at least two acquired second images to obtain the target image. The target image contains all the information of the shot scene and can reflect the real visual effect of the shot scene. Specifically, the electronic device can process each of the second images through a tone mapping algorithm or based on contrast or gradient threshold methods, etc., to obtain the fused target image. Alternatively, the electronic device can also align the at least two second images before performing the fusion process, which can prevent an appearance of ghosts and improve image quality.

Alternatively, after the electronic device obtains the target image, it can display a thumbnail of the target image on a camera preview interface. It can also display the target image on a display screen of the electronic device for user preview. It can also provide saving, editing, sharing, and other options on the image preview interface for users to do further operations.

In the present disclosure, the first camera acquires the at least two first images by using the at least two different first exposure parameters. The content analysis is performed on each of the first images, and the at least two second exposure parameters are determined according to the obtained content analysis result and the at least two different first exposure parameters. The second camera performs the image acquisition with the at least two second exposure parameters to acquire the at least two second images. The fusion process is performed on the at least two second images to obtain the target image. Therefore, it is possible to prevent the use of one uniform exposure parameter to acquire images, resulting in the fused image being inaccurate. By analyzing the plurality of images acquired by the first camera, the exposure parameters of the images used for the fusion process are obtained. After the second camera acquires the images according to the exposure parameters, the acquired images are fused. That is, the exposure parameters of the images used for the fusion process can be determined according to the current shooting scene, which can improve the quality of the image. Moreover, two cameras are used for processing separately, which can prevent affecting the operation of the second camera and ensure the second camera being functionally normal.

In some embodiments, the second camera is a main camera of the electronic device. That is, the images acquired by the electronic device through the second camera are usually used for preview and displayed on the display screen of the electronic device. Specifically, the electronic device can control the second camera of the electronic device to acquire the images when receiving a camera enabled instruction, and then displays the images on the display screen of the electronic device. The first camera simultaneously acquires the at least two first images corresponding to the different first exposure parameters. The content analysis is performed on each of the first images. The at least two second exposure parameters are determined based on the content analysis result. Therefore, when the electronic device receives the image acquisition instruction, it can use the second camera to perform the image acquisition with the at least two exposure parameters to acquire the corresponding at least two second images. Alternatively, the electronic device may also acquire the at least two first images corresponding to the different first exposure parameters through the first camera when receiving the image acquisition instruction. The content analysis us performed on each of the first images. The at least two second exposure parameters are determined based on the content analysis result. A power consumption of the electronic device can be reduced.

The plurality of images acquired by the first camera are analyzed to obtain the exposure parameters of the images used for the fusion process, and the second camera acquires the images according to the exposure parameters, and then the fusion proves is performed. That is, the second camera acquires the images for preview, and the first camera simultaneously determines the exposure parameters of the images used for the fusion process, which can prevent affecting an image preview performance of the second camera and ensure a normal display of the preview interface.

In some embodiments, before the electronic device acquires the at least two first images through the first camera, it may also include following operations. The second camera acquires a preview image. It is determined whether the preview image is a high light ratio image according to brightness distribution information of the preview image. The first camera performs the operation of acquiring the at least two first images by using the at least two different first exposure parameters if it is determined that the preview image is the high light ratio image.

The preview image refers to an image acquired by the camera that can be displayed on the display screen of the electronic device in real time. The electronic device can acquire the preview image through the second camera, thereby determining whether the preview image is the high light ratio image according to the brightness distribution information of the preview image. A light ratio refers to a ratio of light received by a dark side to a bright side of a photographed object. The high light ratio image refers to an image having a certain difference between the light received by the dark side and the bright side in the image. The electronic device can determine whether the preview image is the high light ratio image according to the brightness distribution information of the preview image. Alternatively, the electronic device determines that the preview image is the high light ratio image if there are pixels with large brightness values in the preview image. The electronic device can also create a brightness distribution histogram of the preview image. When it is determined according to the brightness distribution histogram that a number of pixels distributed on both sides of the histogram in the preview image reaches a preset number, the preview image is determined to be the high light ratio image, etc.

The electronic device can perform the operation of acquiring the at least two first images through the first camera if it is determined that the preview image acquired by the second camera is the high light ratio image. That is, if the electronic device determines that the current shooting scene is a high light ratio scene, it can acquire the first images with the plurality of different first exposure parameters through the first camera, determine the plurality of second exposure parameters according to the content analysis result of the first images, and acquire the corresponding second images for synthesis through the second camera with the second exposure parameters. The synthesized target image can truly reflect the information of the photographed object, thereby improving accuracy of the target image, and enabling an HDR function of the camera intelligently.

Figure 3:
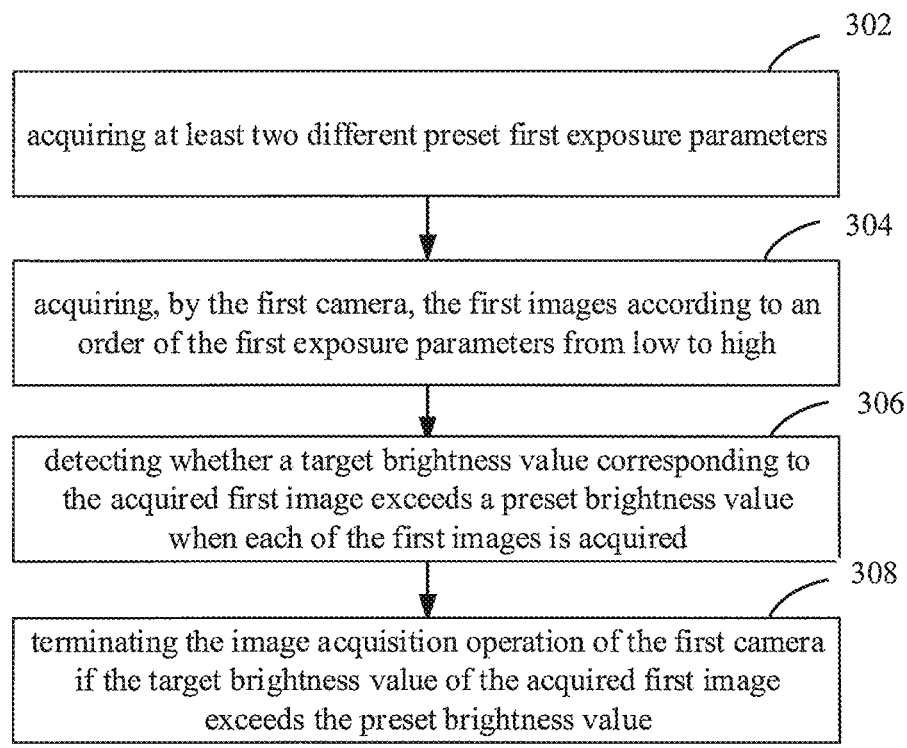
FIG. 3 illustrates a flowchart of acquiring at least two first images in one or more embodiments.

FIG. 3 illustrates a flowchart of acquiring at least two first images in one embodiment. As illustrated in FIG. 3, in some embodiments, the process of acquiring the at least two first images corresponding to the at least two different first exposure parameters by the first camera includes following operations.

In an operation 302, at least two different preset first exposure parameters are acquired.

Specifically, the electronic device is preset with at least two different first exposure parameters, and the electronic device can acquire at least two preset first exposure parameters when the camera is enabled.

In an operation 304, the first camera acquires the first images according to an order of the first exposure parameters from low to high.

The order of the first exposure parameters from low to high refers to an order of exposure times in the first exposure parameters from low to high. For example, when the exposure times in the preset plurality of first exposure parameters of the electronic device are 0.02 s, 0.05 s, and 0.08 s, the electronic device can first set the exposure time of the first camera to 0.02 s to acquire a first first image, and then set the exposure time of the first camera to 0.05 s to acquire a second first image, and then set the exposure time of the first camera to 0.08 s to acquire a third first image.

In an operation 306, it is detected whether a target brightness value corresponding to the acquired first image exceeds a preset brightness value when each of the first images is acquired.

The preset brightness value can be set according to actual application requirements. Specifically, the preset brightness value is greater than or equal to a brightness value when the image is overexposed. Alternatively, the electronic device may determine the target brightness value according to at least one of an average photometry value, a center photometry value, and a spot photometry value corresponding to the first image. The average photometry value is an average value of brightness of pixels in the first image. The center photometry value is determined according to brightness values of pixels in a center area of the first image. The spot photometry value is determined by a brightness value of a composition center point or a focus point of the first image.

The electronic device can detect whether the target brightness value corresponding to the acquired first image exceeds the preset brightness value when each of the first images is acquired by the first camera.

In an operation 308, the image acquisition operation of the first camera is terminated if the target brightness value of the acquired first image exceeds the preset brightness value.

If the target brightness value of the acquired first image exceeds the preset brightness value, the electronic device terminates the image acquisition operation of the first camera. Alternatively, in some embodiments, the electronic device can also directly complete the image acquisition operation of the first camera according to at least two preset first exposure parameters. That is, the brightness of the acquired first image is not detected.

The first camera acquires the first images according to the order of the first exposure parameters from low to high. It is detected whether the target brightness value corresponding to the acquired first image exceeds the preset brightness value when each of the first images is acquired. The image acquisition operation of the first camera is terminated if the target brightness value of the acquired first image exceeds the preset brightness value. That is, the image acquisition operation can be terminated when the first image is overexposed, which can improve an acquisition efficiency of the first image. Moreover, an invalid image is further removed for the first image analysis operation, an efficiency of the image analysis can be improved.

Figure 4:
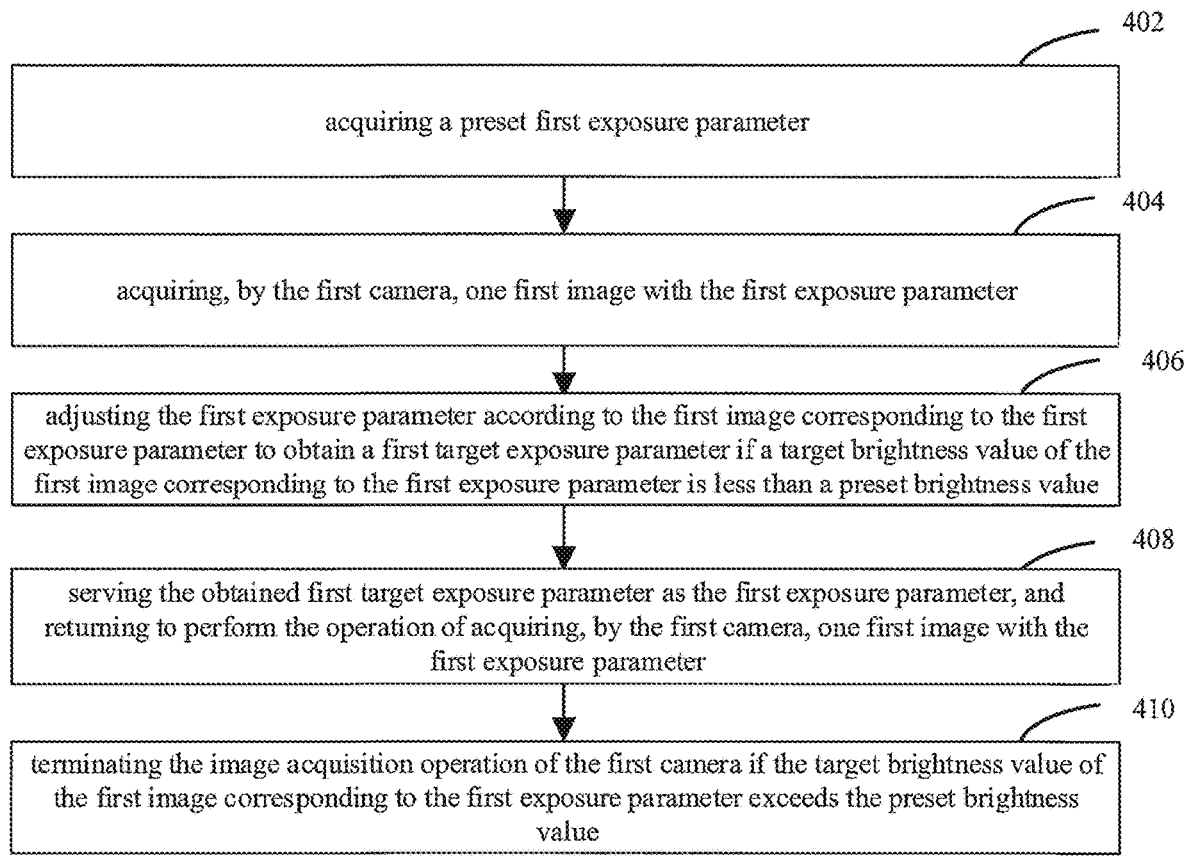
FIG. 4 illustrates a flowchart of acquiring at least two first images in one or more embodiments.

FIG. 4 illustrates a flowchart of acquiring at least two first images in another one embodiment. As illustrated in FIG. 4, in some embodiments, the process of acquiring the at least two first images corresponding to the at least two different first exposure parameters through the first camera includes following operations.

In an operation 402, a preset first exposure parameter is acquired.

The preset first exposure parameter can be set according to actual application requirements. Specifically, the image acquired by the electronic device according to the preset first exposure parameter is an image with lower brightness.

In an operation 404, the first camera acquires one first image with the first exposure parameter.

Specifically, the electronic device controls the first camera to acquire the first image with the first exposure parameter.

In an operation 406, the first exposure parameter is adjusted according to the first image corresponding to the first exposure parameter to obtain a first target exposure parameter if a target brightness value of the first image corresponding to the first exposure parameter is less than a preset brightness value.

The electronic device can adjust the first exposure parameter according to the first image to determine the first target exposure parameters if the target brightness value of the acquired first image is less than the preset brightness value. Specifically, the electronic device can adjust the first exposure parameter according to at least one of the target brightness value, an amount of image information, brightness distribution information, and color distribution information of the first image, so as to obtain the first target exposure parameters. Taking adjustment according to the target brightness value of the first image as an example, the electronic device can preset brightness ranges corresponding to different exposure parameters. When the target brightness value of the first image corresponding to the first exposure parameter is less than a minimum value of a corresponding brightness range, the first exposure parameter is increased by a first difference value. When the target brightness value of the first image is greater than a maximum value of a corresponding brightness range, the first exposure parameter is increased by a second difference value. When the target brightness value of the first image is within a brightness range, the first exposure parameter is increased by a third difference value. The first difference value is greater than the third difference value, and the third difference value is greater than the second difference value.

In an operation 408, the obtained first target exposure parameter serves as the first exposure parameter, and it returns to perform the operation of acquiring, by the first camera, one first image with the first exposure parameter.

Specifically, the electronic device may use the adjusted first target exposure parameter as the first exposure parameter, so as to repeatedly perform the operation of acquiring the first image with the first exposure parameter.

In an operation 410, the image acquisition operation of the first camera is terminated if the target brightness value of the first image corresponding to the first exposure parameter exceeds the preset brightness value.

If the target brightness value of the first image corresponding to the first exposure parameter exceeds the preset brightness value, the electronic device terminates the image acquisition operation of the first camera and no longer adjusts the first exposure parameter.

When the first image is acquired by the first camera, the first exposure parameter is adjusted according to the acquired first image to obtain the first target exposure parameter, and then the first target exposure parameter serves as the first exposure parameter to acquire the first image. That is, at least two first images can be acquired repeatedly with at least two different exposure parameters until the target brightness value of the acquired first image exceeds the preset brightness value, thereby improving accuracy of the first images.

Figure 5:
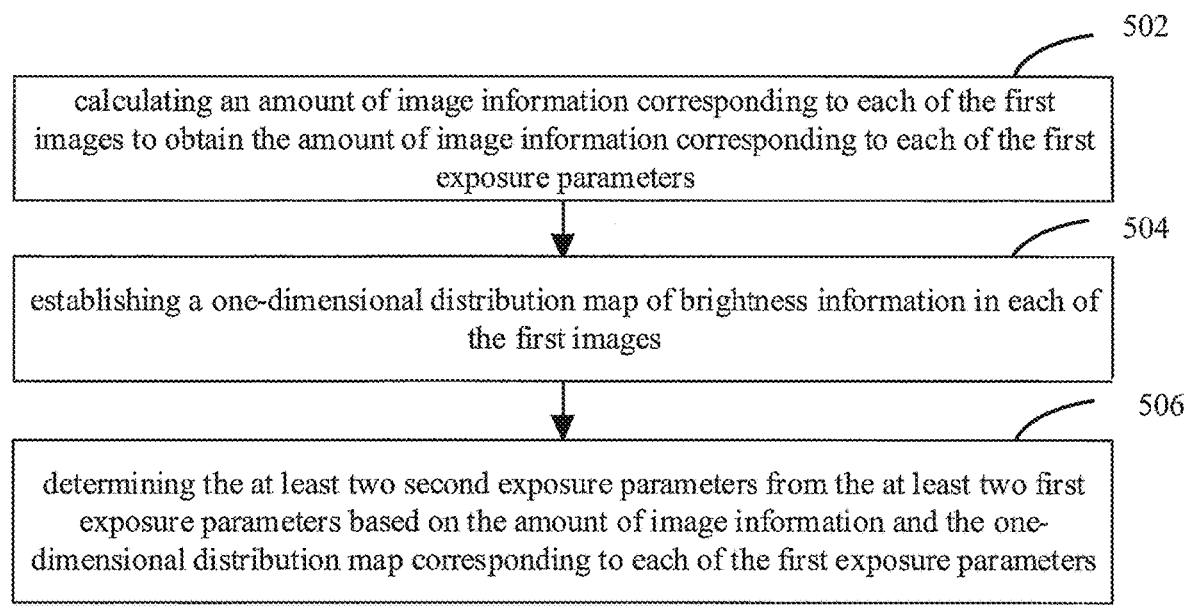
FIG. 5 illustrates a flowchart of determining second exposure parameters according to first images in one or more embodiments.

FIG. 5 illustrates a flowchart of determining second exposure parameters according to first images in one embodiment. As illustrated in FIG. 5, in some embodiments, in the image acquisition method, the operation of performing the content analysis on each of the first images, and determining the at least two second exposure parameters according to the obtained content analysis result and the at least two different first exposure parameters includes following operations.

In an operation 502, an amount of image information corresponding to each of the first images is calculated to obtain the amount of image information corresponding to each of the first exposure parameters.

The amount of image information is a total amount of information provided by the image. Specifically, the amount of image information reflects complexity of the image. Each first image acquired by the electronic device corresponds to one of the first exposure parameters. Therefore, the electronic device calculates the amount of image information corresponding to each first image, that is, the amount of image information corresponding to each first exposure parameter can be obtained. Specifically, the electronic device can calculate the amount of image information using a calculation formula corresponding to an image entropy. Alternatively, the electronic device integrates invalid information in the first images to calculate the amount of image information of the first image.

In an operation 504, a one-dimensional distribution map of brightness information in each of the first images is established.

The one-dimensional distribution map corresponding to the brightness information is the brightness distribution histogram corresponding to the first image. According to the brightness distribution histogram, the number of pixels corresponding to different brightness values in the first image can be determined. Through the brightness distribution histogram of the first image, the electronic device can also determine whether the first image is an underexposed, accurately exposed, or overexposed image according to the brightness distribution histogram.

In an operation 506, the at least two second exposure parameters are determined from the at least two first exposure parameters based on the amount of image information and the one-dimensional distribution map corresponding to each of the first exposure parameters.

The electronic device determines the at least two second exposure parameters based on the amount of image information corresponding to each first exposure parameter and the one-dimensional distribution map corresponding to each first image. Specifically, the electronic device can calculate an information distribution of the photographed object in different brightness ranges according to the amount of image information and the corresponding one-dimensional distribution map corresponding to each first exposure parameter. Therefore, the at least two second exposure parameters containing the most information of the photographed object are determined from the at least two first exposure parameters. The second images acquired according to the at least two second exposure parameters contain the most information about the photographed object.

The amount of image information corresponding to each of the first images is calculated to obtain the amount of image information corresponding to each of the first exposure parameters. The one-dimensional distribution map of brightness information in each of the first images is established. The at least two second exposure parameters are determined based on the amount of image information and the one-dimensional distribution map corresponding to each of the first exposure parameters. Thus, the second images acquired according to the at least two second exposure parameters contain the most information about the photographed object.

Figure 6:
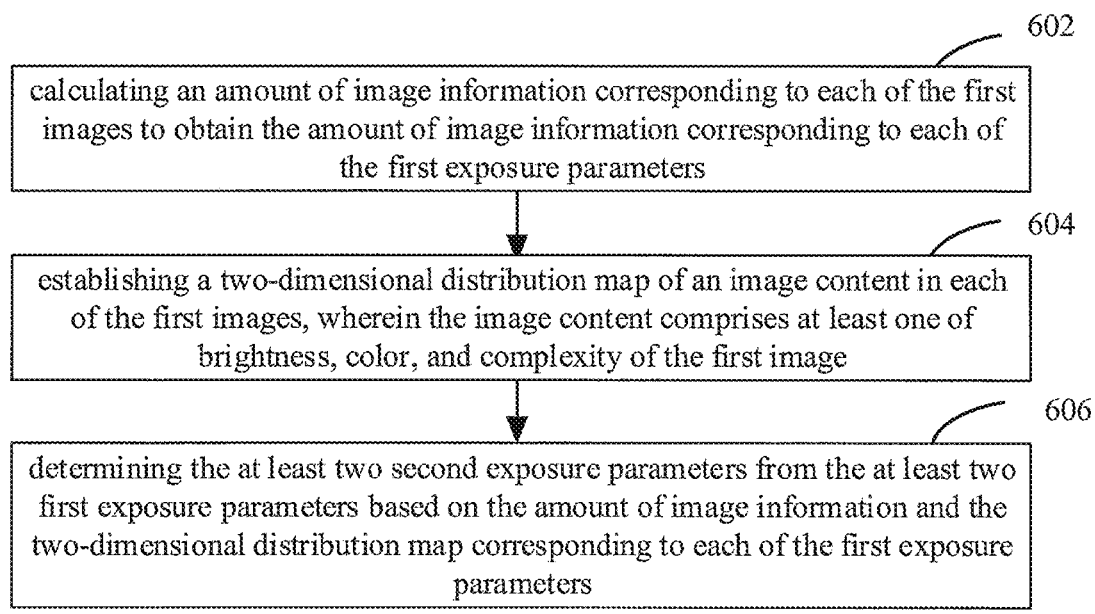
FIG. 6 illustrates a flowchart of determining the second exposure parameters according to first images in one or more embodiments.

FIG. 6 illustrates a flowchart of determining the second exposure parameters according to first images in one embodiment. As illustrated in FIG. 6, in some embodiments, in the image acquisition method, the operation of performing the content analysis on each of the first images, and determining the at least two second exposure parameters according to the obtained content analysis result and the at least two different first exposure parameters includes following operations.

In an operation 602, an amount of image information corresponding to each of the first images is calculated to obtain the amount of image information corresponding to each of the first exposure parameters.

In an operation 604, a two-dimensional distribution map of an image content in each of the first images is established. The image content includes at least one of brightness, color, and complexity of the first image.

The electronic device establishes the two-dimensional distribution map of the image content in each first image. According to the established two-dimensional distribution map, a distribution position and a size of the image content in the first image can be determined. The image content includes at least one of the brightness, color, and complexity of the first image. In some embodiments, the image content may also be saturation, color temperature, etc., which is not limited here. Take the establishment of the two-dimensional distribution map of the brightness of the first image as an example, the electronic device can establish a three-dimensional coordinate system with a center of the first image as an origin, a plane where the first image is located as an X-Y plane, and the brightness information of the first image as a Z-axis. According to the two-dimensional distribution map, the electronic device can clarify a spatial distribution of the brightness information in the first image.

In an operation 606, the at least two second exposure parameters are determined from the at least two first exposure parameters based on the amount of image information and the two-dimensional distribution map corresponding to each of the first exposure parameters.

The electronic device determines the at least two second exposure parameters based on the amount of image information corresponding to different first exposure parameters and the two-dimensional distribution map of the image content corresponding to each first image. Specifically, the electronic device can determine the distribution of image information in the first image according to the amount of image information corresponding to the first exposure parameters and the two-dimensional distribution map of the image content of the first image. For example, in the two-dimensional distribution map of the color of the first image, the less image information is distributed in areas with a single color, the more image information is distributed in areas with rich colors. Furthermore, the electronic device can compare an increment of the difference information between different first images according to the information distribution of each first image. Therefore, based on the incremental comparison of the difference information between different first images, the electronic device can determine the at least two second exposure parameters from the at least two first exposure parameters that contain the most information about the photographed object. Alternatively, the electronic device can perform an incremental comparison of the difference information between two adjacent first images, and can also divide the first images according to the first exposure parameters to determine the increment of the difference information between the first images divided into a same assembly.

The amount of image information corresponding to each of the first images is calculated to obtain the amount of image information corresponding to each of the first exposure parameters. The two-dimensional distribution map of the image content in each of the first images is established. The at least two second exposure parameters are determined from the at least two first exposure parameters based on the amount of image information and the two-dimensional distribution map corresponding to each of the first exposure parameters. This can determine the at least two second exposure parameters configured to generate the HDR image according to the spatial distribution of the amount of image information in the first image. This can improve accuracy of the second exposure parameters and quality of the target image.

Figure 7:
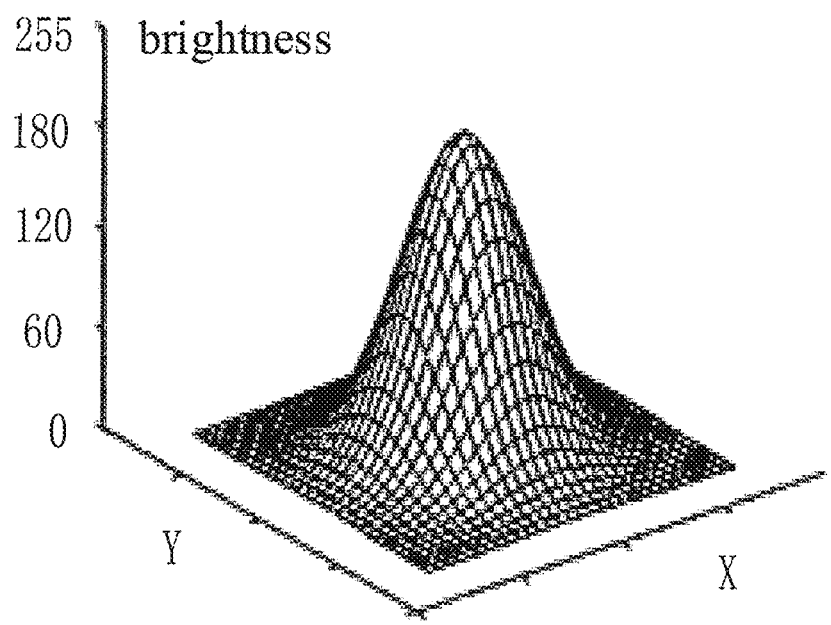
FIG. 7 illustrates a two-dimensional distribution map of a brightness of a first image in one or more embodiments.

FIG. 7 illustrates a two-dimensional distribution map of a brightness of a first image in one embodiment. As illustrated in FIG. 7, an X-Y axis of a coordinate system is a plane where the image is located, and a Z-axis is brightness values of pixels. From the two-dimensional distribution map, it can be known that a middle area of the first image is the brightest, so that the middle area gradually becomes darker to a surrounding area. According to the two-dimensional distribution map, it can be determined that the amount of information of the first image is mainly distributed in a transition area between the middle area and the surrounding area of the first image.

Figure 8:
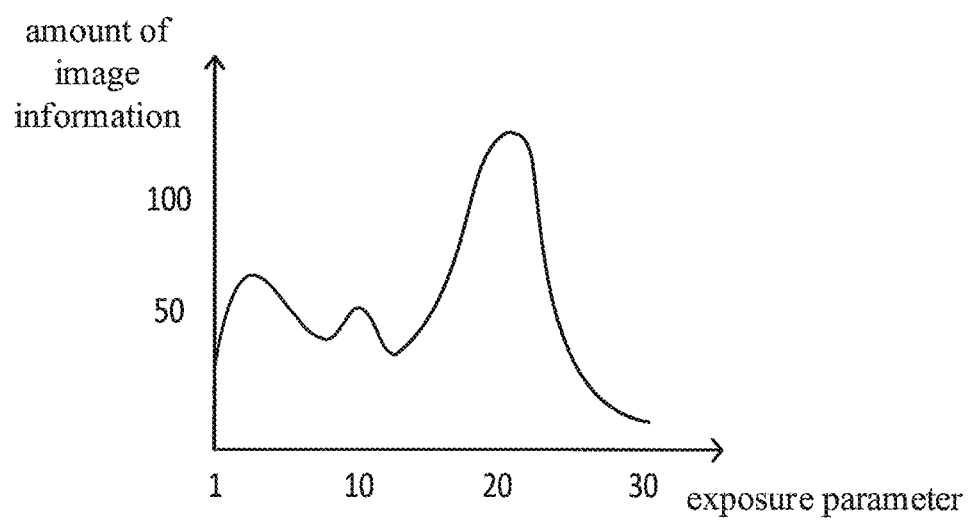
FIG. 8 illustrates a schematic diagram of an amount of image information corresponding to each first exposure parameter in one or more embodiments.

FIG. 8 illustrates a schematic diagram of an amount of image information corresponding to each first exposure parameter in one embodiment. As illustrated in FIG. 8, a horizontal axis is the first exposure parameter corresponding to the first image, and a vertical axis is the amount of image information in the first image corresponding to the first exposure parameter. In combination with the amount of image information of the first image and the two-dimensional distribution map of the image content can determine the distribution of the amount of image information in the first image. In this way, it is possible to perform an incremental comparison of the difference information for different first images, so as to determine the at least two second exposure parameters that contain the most information of the photographed object.

Figure 9:
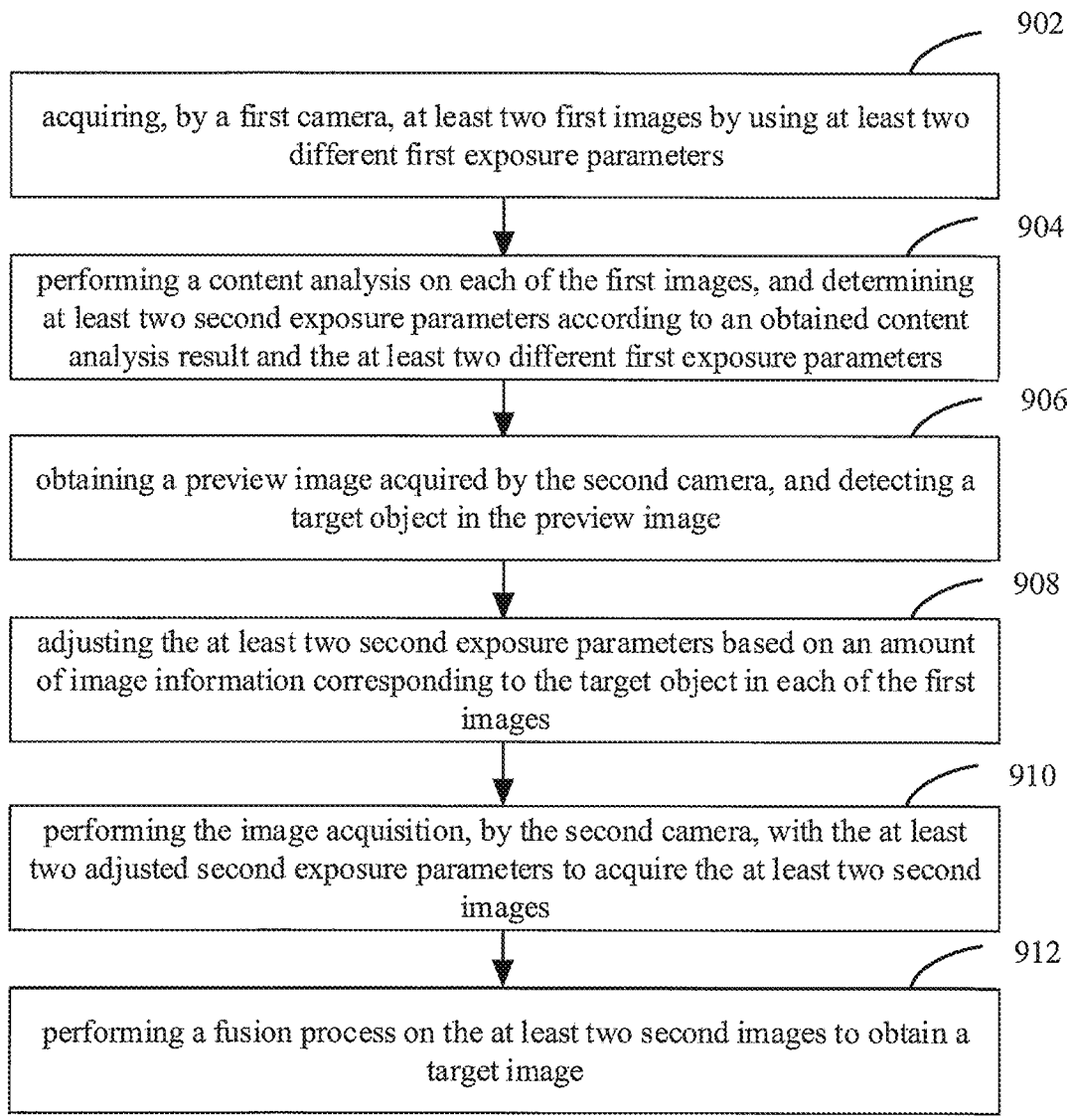
FIG. 9 illustrates a flowchart of an image acquisition method in one or more embodiments.

FIG. 9 illustrates a flowchart of an image acquisition method in one embodiment. As illustrated in FIG. 9, in some embodiments, the image acquisition method includes following operations.

In an operation 902, at least two first images corresponding to at least two different first exposure parameters are acquired through the first camera.

In an operation 904, a content analysis is performed on each first image, and at least two second exposure parameters are determined based on the obtained content analysis result and the at least two different first exposure parameters.

In an operation 906, a preview image acquired by the second camera is obtained, and a target object in the preview image is detected.

Specifically, the electronic device can identify the target object in the preview image through feature information matching, target detection algorithms, etc.

In an operation 908, the at least two second exposure parameters are adjusted based on an amount of image information corresponding to the target object in each of the first images.

The amount of image information corresponding to the target object is the amount of image information contained in a corresponding area of the target object in the first image. The electronic device can calculate the amount of image information corresponding to the target object of each first image. The larger the amount of image information corresponding to the target object, the clearer the imaging of the target object and the better the shooting performance. The electronic device adjusts the at least two second exposure parameters based on the amount of image information corresponding to the target object in each first image. Specifically, the electronic device can obtain the first exposure parameter corresponding to the first image with the largest amount of image information corresponding to the target object. The at least two second exposure parameters are adjusted according to the first exposure parameters. Alternatively, when there are at least two second exposure parameters that are lower than the first exposure parameters, the electronic device may appropriately increase the second exposure parameters. When at least two of the second exposure parameters are higher than the first exposure parameters, the electronic device can lower the second exposure parameters. The electronic device can also control a difference between at least one second exposure parameter and the first exposure parameter within a preset range, etc., which is not limited to this.

In an operation 910, the second camera performs the image acquisition with the at least two adjusted second exposure parameters to acquire the at least two second images.

Based on the amount of image information corresponding to the target object in each first image, the electronic device adjusts the at least two second exposure parameters to obtain at least two adjusted second exposure parameters. The electronic device can use the second camera to perform the image acquisition with the at least two adjusted second exposure parameters to acquire the at least two second images.

In an operation 912, a fusion process is performed on the at least two second images to obtain the target image.

The preview image is detected to obtain the target object in the preview image. The second exposure parameters are adjusted according to the amount of image information corresponding to the target object in each first image, so that the target object in the second image acquired according to the adjusted second exposure parameters is more clearly imaged. It can meet shooting requirements of the target object, and improve accuracy of the image acquisition and the quality of the synthesized target image.

Figure 10:
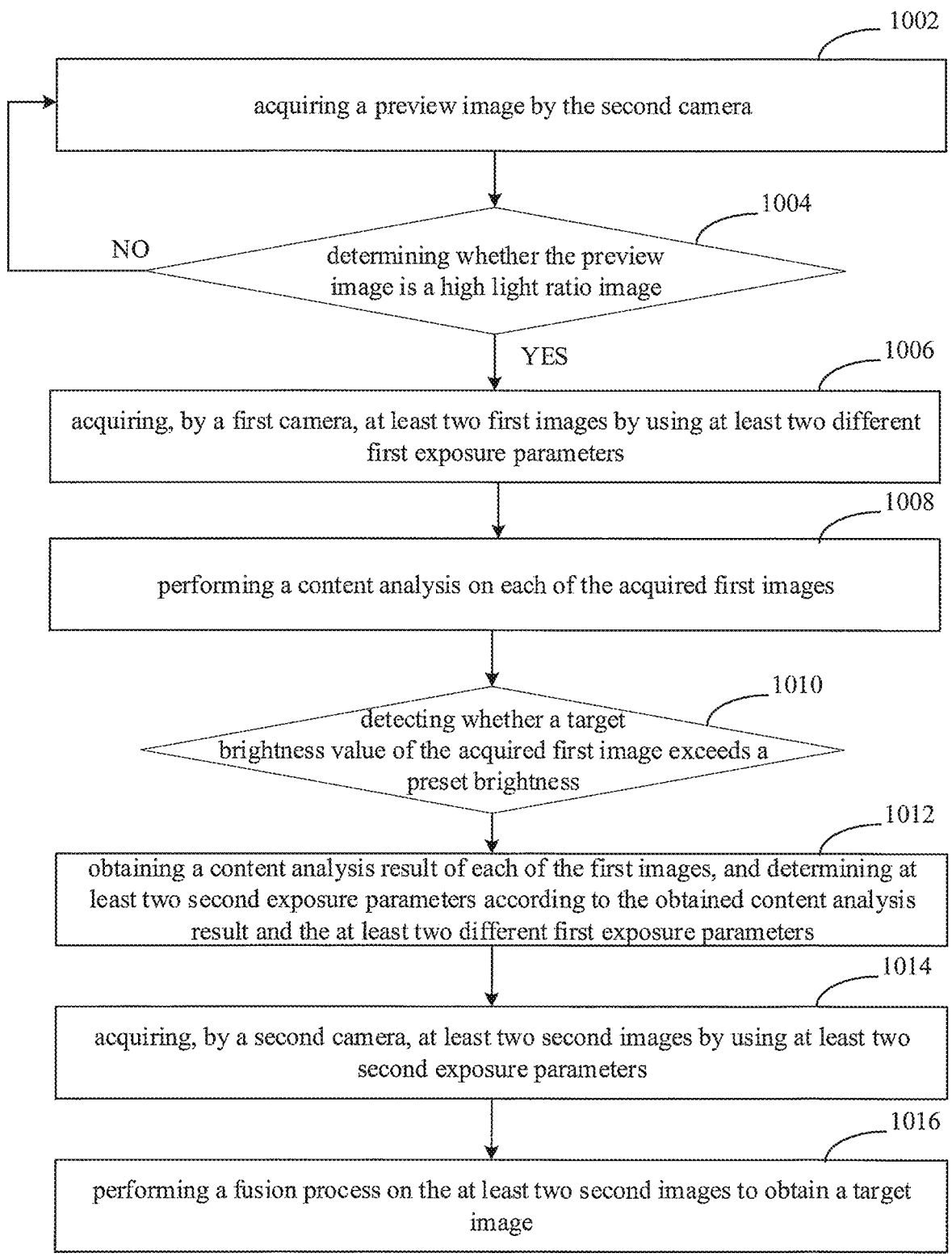
FIG. 10 illustrates a flowchart of an image acquisition method in one or more embodiments.

FIG. 10 illustrates a flowchart of an image acquisition method in one embodiment. As illustrated in FIG. 10, in some embodiments, specific operations for implementing the image acquisition method are as follows:

In an operation 1002, a preview image is acquired by the second camera.

In an operation 1004, it is determined whether the preview image is a high light ratio image. Specifically, the electronic device determines whether the preview image is a high light ratio image according to the brightness distribution information of the preview image. If the preview image is the high light ratio image, it performs an operation 1006. If the preview image is not the high light ratio image, it returns to the operation 1002.

In the operation 1006, the first camera acquires the at least two first images by using the at least two different first exposure parameters. Alternatively, the electronic device can obtain at least two different preset first exposure parameters. The first images are acquired by the first camera according to an order of the first exposure parameters from low to high.

Alternatively, the electronic device can also obtain preset first exposure parameter, and control the first camera to acquire the first image with the first exposure parameter. The first exposure parameter is adjusted according to the first image corresponding to the first exposure parameter to obtain a first target exposure parameter. The obtained first target exposure parameter serves as the first exposure parameter, and it returns to perform the operation of acquiring the first image with the first exposure parameter through the first camera.

In the operation 1008, an image content in each acquired first image is analyzed.

In the operation 1010, it is detected whether a target brightness value of the acquired first image exceeds a preset brightness value. The electronic device can detect whether the target brightness value corresponding to the acquired first image exceeds the preset brightness value when each of the first images is acquired by the first camera. If the target brightness value of the acquired first image exceeds the preset brightness value, the image acquisition operation of first camera is terminated, and it enters to an operation 1012.

In the operation 1012, a content analysis result of each of the first images is acquired. The at least two second exposure parameters are determined based on the content analysis result and the at least two first exposure parameters. The electronic device can analyze the content of the first image when the first image is acquired. After terminating the image acquisition operation of the first camera, the electronic device can obtain the content analysis result of each first image. The at least two second exposure parameters are determined based on the content analysis result and the at least two first exposure parameters.

Alternatively, the electronic device can calculate the amount of image information corresponding to each first image, and obtain the amount of image information corresponding to each first exposure parameter. The two-dimensional distribution map of the image content contained in each first image is established. The image content includes at least one of the brightness, color, and complexity of the image. The at least two second exposure parameters are determined from the at least two first exposure parameters based on the amount of image information and the two-dimensional distribution map corresponding to each first exposure parameter.

Alternatively, the electronic device can also calculate the amount of image information corresponding to each first image, and obtain the amount of image information corresponding to each first exposure parameter. The one-dimensional distribution map corresponding to the brightness information contained in each first image is established. The at least two second exposure parameters are determined from the at least two first exposure parameters based on the amount of image information and the one-dimensional distribution map corresponding to each first exposure parameter.

Alternatively, the electronic device can detect the target object in the preview image. Based on the amount of image information corresponding to the target object in each first image, the at least two second exposure parameters are adjusted.

In the operation 1014, the first camera acquires at least two second images corresponding to the at least two second exposure parameters. Alternatively, the electronic device may acquire the at least two second images corresponding to at least two latest second exposure parameters when receiving an image acquisition instruction.

In the operation 1016, a fusion process is performed on the at least two acquired two second images to obtain a target image.

It should be understood that although the various operations in the flowcharts of FIG. 2 to FIG. 6, FIG. 9, and FIG. 10 are displayed in sequence as indicated by arrows, these operations are not necessarily performed in sequence in the order indicated by the arrows. Unless explicitly stated in this article, there is no strict order for the execution of these operations. These operations can be performed in other orders. Moreover, at least a part of the operations in FIG. 2 to FIG. 6, FIG. 9, and FIG. 10 may include a plurality of sub-operations or a plurality of stages. These sub-operations or stages are not necessarily executed at the same time, and can be executed at different times. The execution order of these sub-operations or stages is not necessarily performed sequentially, and may be executed alternately or alternately with at least a part of other operations or sub-operations or stages of other operations.

Figure 11:
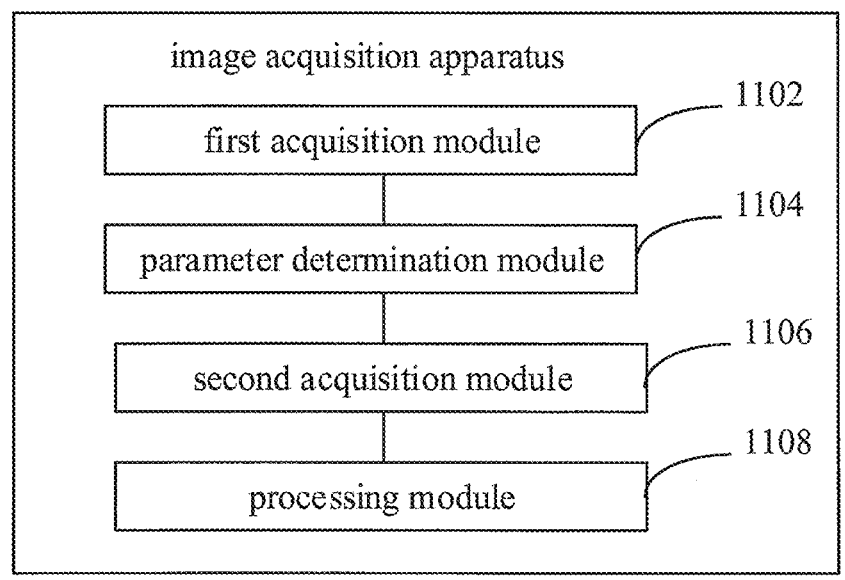
FIG. 11 illustrates a structural block diagram of an image acquisition apparatus according to one or more embodiments.

FIG. 11 illustrates a structural block diagram of an image acquisition apparatus according to one embodiment. As illustrated in FIG. 11, the image acquisition apparatus includes a first acquisition module 1102, a parameter determination module 1104, a second acquisition module 1106, and a processing module 1108.

The first acquisition module 1102 is configured to acquire, by a first camera, at least two first images by using at least two different first exposure parameters.

The parameter determination module 1104 is configured to perform a content analysis on each of the first images, and determine at least two second exposure parameters according to an obtained content analysis result and the at least two different first exposure parameters.

The second acquisition module 1106 is configured to perform an image acquisition, by a second camera, with the at least two second exposure parameters to acquire at least two second images.

The processing module 1108 is configured to perform a fusion process on the at least two second images to obtain a target image.

In the image acquisition apparatus of the embodiment of the present disclosure, the first camera acquires the at least two first images by using the at least two different first exposure parameters. The content analysis is performed on each of the first images, and the at least two second exposure parameters are determined according to the obtained content analysis result and the at least two different first exposure parameters. The second camera performs the image acquisition with the at least two second exposure parameters to acquire the at least two second images. The fusion process is performed on the at least two second images to obtain the target image. By analyzing the plurality of images acquired by the first camera, the exposure parameters of the images used for the fusion process are obtained. After the second camera acquires the images according to the exposure parameters, the acquired images are fused, which can improve the quality of the acquired images.

In some embodiment, the parameter determination module 1104 is also configured to calculate an amount of image information corresponding to each of the first images to obtain the amount of image information corresponding to each of the first exposure parameters; to establish a two-dimensional distribution map of an image content in each of the first images, where the image content includes at least one of brightness, color, and complexity of the first image; and to determine the at least two second exposure parameters from the at least two first exposure parameters based on the amount of image information and the two-dimensional distribution map corresponding to each of the first exposure parameters.

In some embodiment, the parameter determination module 1104 is also configured to obtain a preview image acquired by the second camera; to detect a target object in the preview image; and to adjust the at least two second exposure parameters based on an amount of image information corresponding to the target object in each of the first images. The second acquisition module 1106 is also configured to perform the image acquisition, by the second camera, with the at least two adjusted second exposure parameters to acquire the at least two second images.

In some embodiment, the parameter determination module 1104 is also configured to calculate an amount of image information corresponding to each of the first images to obtain the amount of image information corresponding to each of the first exposure parameters; to establish a one-dimensional distribution map of brightness information in each of the first images; and to determine the at least two second exposure parameters from the at least two first exposure parameters based on the amount of image information and the one-dimensional distribution map corresponding to each of the first exposure parameters.

In some embodiment, the first acquisition module 1102 is also configured to acquire a preview image by the second camera; to determine whether the preview image is a high light ratio image according to brightness distribution information of the preview image; and to acquire, by the first camera, the at least two first images by using the at least two different first exposure parameters if it is determined that the preview image is the high light ratio image.

In some embodiment, the first acquisition module 1102 is also configured to acquire at least two different preset first exposure parameters; to acquire, by the first camera, the first images according to an order of the first exposure parameters from low to high; to detect whether a target brightness value corresponding to the acquired first image exceeds a preset brightness value when each of the first images is acquired; and to terminate the image acquisition operation of the first camera if the target brightness value of the acquired first image exceeds the preset brightness value. The target brightness value can be determined according to at least one of an average photometry value, a center photometry value, and a spot photometry value corresponding to the first image.

In some embodiment, the first acquisition module 1102 is also configured to acquire a preset first exposure parameter; to acquire, by the first camera, one first image with the first exposure parameter; to adjust the first exposure parameter according to the first image corresponding to the first exposure parameter to obtain a first target exposure parameter if a target brightness value of the first image corresponding to the first exposure parameter is less than a preset brightness value; to serve the obtained first target exposure parameter as the first exposure parameter, and returning to perform the operation of acquiring, by the first camera, one first image with the first exposure parameter; and to terminate the image acquisition operation of the first camera if the target brightness value of the first image corresponding to the first exposure parameter exceeds the preset brightness value.

The distinction between the various modules in the above image acquisition apparatus is for illustration only. In other embodiments, the image acquisition apparatus may be divided into different modules as required to complete all or part of functions of the above image acquisition apparatus.

Figure 12:
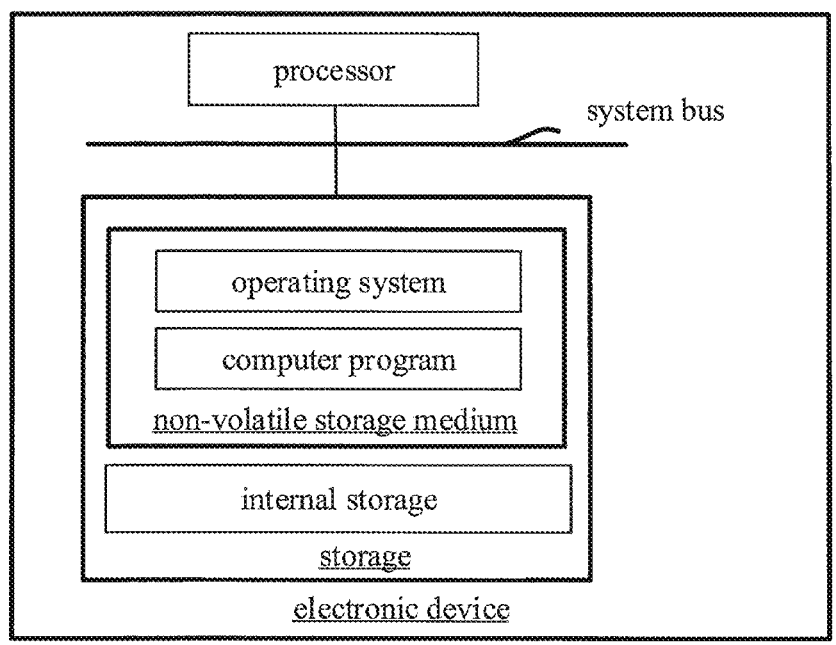
FIG. 12 illustrates a schematic diagram of an internal structure of an electronic device in one or more embodiments.

FIG. 12 illustrates a schematic diagram of an internal structure of an electronic device in one embodiment. As illustrated in FIG. 12, the electronic device includes a processor and a storage connected by a system bus. The processor is configured to provide calculation and control capabilities to support the operations of the entire electronic device. The storage can include a non-transitory storage medium and internal storage. The non-transitory storage medium stores an operating system and a computer program. The computer program can be executed by the processor to implement an image acquisition method provided in the following embodiments. The internal storage provides a cache operating environment for the computer program of the operating system in the non-transitory storage medium. The electronic device can be a mobile phone, a tablet computer, a personal digital assistant, or a wearable device.

Each module in the image acquisition apparatus in the embodiments of the present disclosure may be implemented in a form of the computer program. The computer program can be run on a terminal or a server. The program module composed of the computer program can be stored on the storage of the terminal or the server. When the computer program is executed by the processor, the operations of the method described in the embodiments of the present disclosure are realized.

Figure 13:
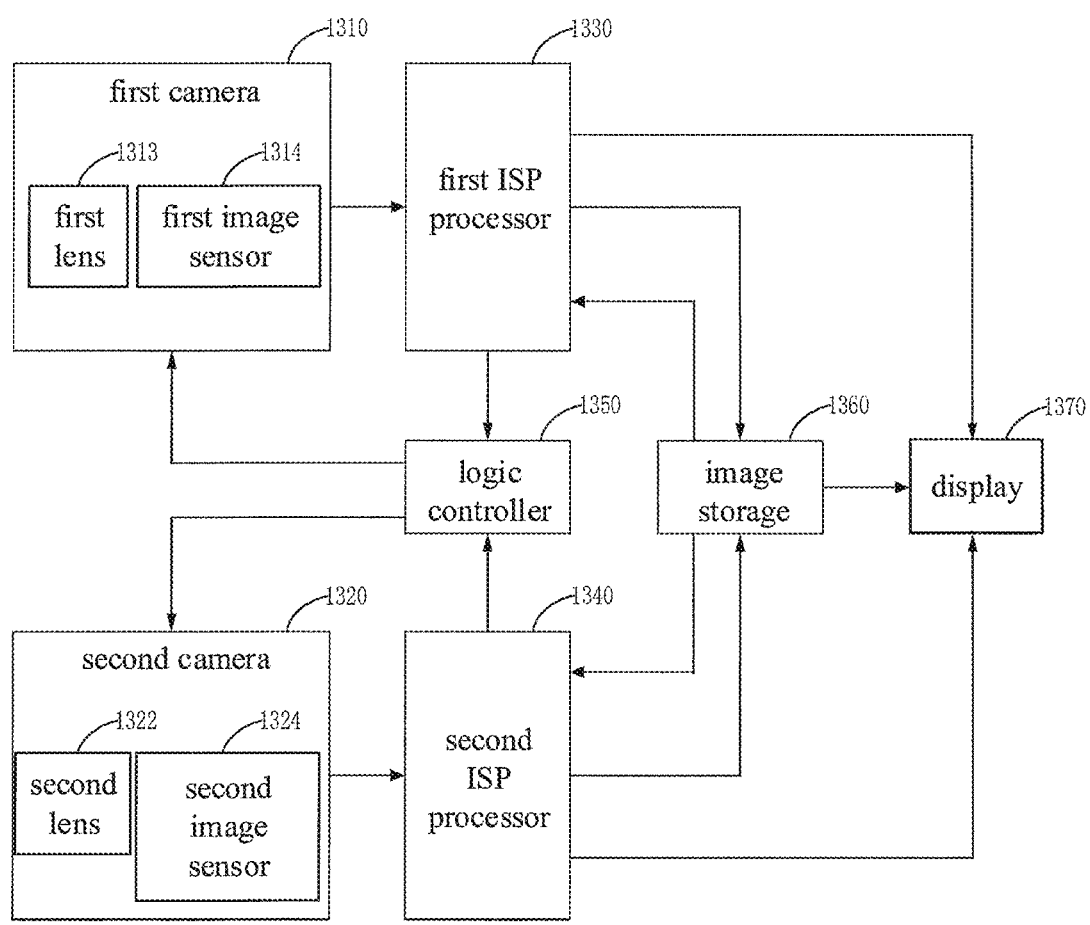
FIG. 13 illustrates a schematic diagram of an image processing circuit in one or more embodiments.

An embodiment of the present disclosure also provides an electronic device. The electronic device includes an image processing circuit, which may be implemented by hardware and/or software components, and may include various processing units that define an image signal processing (ISP) pipeline. FIG. 13 illustrates a schematic diagram of an image processing circuit in one embodiment. As illustrated in FIG.

13, for ease of description, only various aspects of an image processing technology related to the embodiments of the present disclosure are illustrated.

As illustrated in FIG. 13, the image processing circuit includes a first ISP processor 1330, a second ISP processor 1340, and a logic controller 1350. The first camera 1310 includes one or more first lens 1313 and first image sensor 1314. The first image sensor 1314 may include a color filter array (e.g., a Bayer filter). The first image sensor 1314 can obtain a light intensity and wavelength information captured by each imaging pixel of the first image sensor 1314, and provide a set of image data that can be processed by the first ISP processor 1330. The second camera 1320 includes one or more second lens 1322 and second image sensor 1324. The second image sensor 1324 may include a color filter array (e.g., a Bayer filter). The second image sensor 1324 can obtain a light intensity and wavelength information captured by each imaging pixel of the second image sensor 1324, and provide a set of image data that can be processed by the second ISP processor 1340.

The first image acquired by the first camera 1310 is transmitted to the first ISP processor 1330 for processing. After the first ISP processor 1330 processes the first image, it can send a statistical data of the first image (such as, a brightness of the image, a contrast of the image, a color of the image, etc.) to the logic controller 1350. The logic controller 1350 can determine control parameters of the first camera 1310 according to the statistical data. Thus, the first camera 1310 can perform auto-focus, auto-exposure, and other operations according to the control parameters. The first image can be stored in an image storage 1360 after being processed by the first ISP processor 1330. The first ISP processor 1330 can also read the image stored in the image storage 1360 for processing. In addition, the first image can be directly sent to a display 1370 for display after being processed by the ISP processor 1330. The display 1370 can also read the image in the image storage 1360 for display.

The first ISP processor 1330 processes the image data pixel by pixel in a variety of formats. For example, each image pixel may have a bit depth of 13, 10, 13, or 14 bits. The first ISP processor 1330 can perform one or more image processing operations on the image data and acquire statistical information about the image data. The image processing operations can be performed with the same or different bit depth accuracy.

The image storage 1360 may be a part of a storage device, a storage device, or an independent dedicated storage in an electronic device, and may include direct storage access (DMA) features.

When receiving an interface from the first image sensor 1314, the first ISP processor 1330 can perform one or more image processing operations, such as time domain filtering. The processed image data can be sent to the image storage 1360 for additional processing before being displayed. The first ISP processor 1330 receives processed data from the image storage 1360, and performs image data processing in RGB and YCbCr color spaces on the processed data. The image data processed by the first ISP processor 1330 may be output to the display 1370 for viewing by the user and/or further processed by a graphics engine or a graphics processor (GPU). Furthermore, the output of the first ISP processor 1330 can also be sent to the image storage 1360, and the display 1370 can read the image data from the image storage 1360. In some embodiments, the image storage 1360 may be configured to implement one or more frame buffers.

The statistical data determined by the first ISP processor 1330 can be sent to a logic controller 1350. For example, the statistical data may include statistical information of the first image sensor 1314, such as an automatic exposure, an automatic white balance, an automatic focus, a flicker detection, a black level compensation, and a shadow correction of the first lens 1313. The logic controller 1350 may include a processor and/or a microcontroller that executes one or more routines (e.g., firmware), and one or more routines can determine the control parameters of the first camera 1310 and the control parameters of the first ISP processor 1330 based on the received statistical data. For example, the control parameters of the first camera 1310 may include a gain, an integration time of exposure control, anti-shake parameters, flash control parameters, the control parameters of the first lens 1313 (e.g., a focal length for focusing or zooming), or a combination of these parameters. The ISP control parameters may include gain levels and color correction matrices for automatic white balance and color adjustment (for example, during RGB processing), and shading correction parameters of the first lens 1313.

Similarly, the second image acquired by the second camera 1320 is transmitted to the second ISP processor 1340 for processing. After the second ISP processor 1340 processes the first image, it can send statistical data of the second image (e.g., a brightness of the image, a contrast of the image, a color of the image, etc.) to the logic controller 1350. The logic controller 1350 can determine control parameters of the second camera 1320 according to the statistical data. Thus, the second camera 1320 can perform auto-focus, auto-exposure, and other operations according to the control parameters. The second image can be stored in the image storage 1360 after being processed by the second ISP processor 1340. The second ISP processor 1340 can also read the image stored in the image storage 1360 for processing. In addition, the second image can be directly sent to the display 1370 for display after being processed by the ISP processor 1340. The display 1370 can also read the image in the image storage 1360 for display. The second camera 1320 and the second ISP processor 1340 can also implement the processing described in the first camera 1310 and the first ISP processor 1330.

The image processing circuit provided according to the embodiments of the present disclosure can implement the above-mentioned image acquisition methods.

An embodiment of the present disclosure also provides a non-transitory computer-readable storage medium. One or more non-transitory computer-readable storage medium containing computer-executable instructions. When the computer-executable instructions are executed by one or more processors, the processor is caused to execute the operations of the image acquisition methods.

A computer program product that contains instructions. When it runs on a computer, it makes the computer execute the image acquisition methods.

Any reference to memory, storage, database, or other medium as used in the embodiments of the present disclosure can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

The above-mentioned embodiments only express several implementations of the present disclosure, and the description is relatively specific and detailed, but it should not be understood as a limitation of a scope of the present disclosure. It should be noted that for those of ordinary skill in the art, without departing from a concept of the present disclosure, several modifications and improvements can be made. These all belong to the scope of protection of the present disclosure. Therefore, the protection scope of the present disclosure shall be subject to the appended claims.

What is claimed is:

1. An image acquisition method, comprising:
   acquiring, by a first camera, at least two first images by using at least two different first exposure parameters;
   performing a content analysis on each of the first images, and determining at least two second exposure parameters according to an obtained content analysis result and the at least two different first exposure parameters;
   performing an image acquisition, by a second camera, with the at least two second exposure parameters to acquire at least two second images; and
   performing a fusion process on the at least two second images to obtain a target image;
   wherein operation of performing the content analysis on each of the first images, and determining the at least two second exposure parameters according to the obtained content analysis result and the at least two different first exposure parameters comprises:
   calculating an amount of image information corresponding to each of the first images to obtain the amount of image information corresponding to each of the first exposure parameters;
   establishing a two-dimensional distribution map of an image content in each of the first images, wherein the image content comprises at least one of brightness, color, and complexity of the first image; and
   determining the at least two second exposure parameters from the at least two first exposure parameters based on the amount of image information and the two-dimensional distribution map corresponding to each of the first exposure parameters.

2. The method according to claim 1, wherein after the operation of determining the at least two second exposure parameters from the at least two first exposure parameters based on the amount of image information and the two-dimensional distribution map corresponding to each of the first exposure parameters, the method further comprises:
   obtaining a preview image acquired by the second camera, and detecting a target object in the preview image; and
   adjusting the at least two second exposure parameters based on an amount of image information corresponding to the target object in each of the first images; and
   wherein the operation of performing the image acquisition, by the second camera, with the at least two second exposure parameters to acquire the at least two second images, comprises:
   performing the image acquisition, by the second camera, with the at least two adjusted second exposure parameters to acquire the at least two second images.

3. The method according to claim 2, wherein the operation of adjusting the at least two second exposure parameters based on the amount of image information corresponding to the target object in each of the first images, comprise:
   acquiring one of the first images with a most amount of image information corresponding to the target object based on the amount of image information corresponding to the target object in each of the first images; and
   adjusting the at least two second exposure parameters according to one of the first exposure parameters corresponding to the acquired first image.

4. The method according to claim 1, wherein the operation of performing the content analysis on each of the first images, and determining the at least two second exposure parameters according to the obtained content analysis result and the at least two different first exposure parameters, comprises:
   calculating an amount of image information corresponding to each of the first images to obtain the amount of image information corresponding to each of the first exposure parameters;
   establishing a one-dimensional distribution map of brightness information in each of the first images; and
   determining the at least two second exposure parameters from the at least two first exposure parameters based on the amount of image information and the one-dimensional distribution map corresponding to each of the first exposure parameters.

5. The method according to claim 1, wherein before the operation of acquiring, by the first camera, the at least two first images by using the at least two different first exposure parameters, the method further comprises:
   acquiring a preview image by the second camera;
   determining whether the preview image is a high light ratio image according to brightness distribution information of the preview image; and
   performing the operation of acquiring, by the first camera, the at least two first images by using the at least two different first exposure parameters if it is determined that the preview image is the high light ratio image.

6. The method according to claim 1, wherein the operation of acquiring, by the first camera, the at least two first images by using the at least two different first exposure parameters, comprises:
   acquiring at least two different preset first exposure parameters;
   acquiring, by the first camera, the first images according to an order of the first exposure parameters from low to high;
   detecting whether a target brightness value corresponding to the acquired first image exceeds a preset brightness value when each of the first images is acquired; and
   terminating the image acquisition operation of the first camera if the target brightness value of the acquired first image exceeds the preset brightness value.

7. The method according to claim 6, wherein before the operation of detecting whether the target brightness value corresponding to the acquired first image exceeds the preset brightness value, the method comprises:
   determining the target brightness value according to at least one of an average photometry value, a center photometry value, and a spot photometry value corresponding to the first image.

8. The method according to claim 1, wherein the operation of acquiring, by the first camera, the at least two first images by using the at least two different first exposure parameters, comprises:
   acquiring a preset first exposure parameter;
   acquiring, by the first camera, one first image with the first exposure parameter;

adjusting the first exposure parameter according to the first image corresponding to the first exposure parameter to obtain a first target exposure parameter if a target brightness value of the first image corresponding to the first exposure parameter is less than a preset brightness value;

serving the obtained first target exposure parameter as the first exposure parameter, and returning to perform the operation of acquiring, by the first camera, one first image with the first exposure parameter; and terminating the image acquisition operation of the first camera if the target brightness value of the first image corresponding to the first exposure parameter exceeds the preset brightness value.

9. The method according to claim 1, further comprising:
if a camera enabled instruction is received, acquiring an image by the second camera, displaying the image on a display screen, and simultaneously acquiring, by the first camera, the at least two first images by using the at least two different first exposure parameters.

10. An electronic device, comprising a storage and a processor, wherein the storage stores a computer program, and in respond to the computer program is executed by the processor, the processor is caused to perform following operations:

acquiring, by a first camera, at least two first images by using at least two different first exposure parameters;

performing a content analysis on each of the first images, and determining at least two second exposure parameters according to an obtained content analysis result and the at least two different first exposure parameters;

performing an image acquisition, by a second camera, with the at least two second exposure parameters to acquire at least two second images; and performing a fusion process on the at least two second images to obtain a target image;

wherein when the processor executes the operation of performing the content analysis on each of the first images, and determining the at least two second exposure parameters according to the obtained content analysis result and the at least two different first exposure parameters, the processor is further configured to execute following operations:

calculating an amount of image information corresponding to each of the first images to obtain the amount of image information corresponding to each of the first exposure parameters;

establishing a two-dimensional distribution map of an image content in each of the first images, wherein the image content comprises at least one of brightness, color, and complexity of the first image; and determining the at least two second exposure parameters from the at least two first exposure parameters based on the amount of image information and the two-dimensional distribution map corresponding to each of the first exposure parameters.

11. The electronic device according to claim 10, wherein after the processor executes the operation of determining the at least two second exposure parameters from the at least two first exposure parameters based on the amount of image information and the two-dimensional distribution map corresponding to each of the first exposure parameters, the processor is further configured to execute following operations:

obtaining a preview image acquired by the second camera, and detecting a target object in the preview image; and adjusting the at least two second exposure parameters based on an amount of image information corresponding to the target object in each of the first images; and wherein when the processor executes the operation of performing the image acquisition, by the second camera, with the at least two second exposure parameters to acquire the at least two second images, the processor is further configured to execute following operations:

performing the image acquisition, by the second camera, with the at least two adjusted second exposure parameters to acquire the at least two second images.

12. The electronic device according to claim 11, wherein when the processor executes the operation of adjusting the at least two second exposure parameters based on the amount of image information corresponding to the target object in each of the first images, the processor is further configured to execute following operations:

acquiring one of the first images with a most amount of image information corresponding to the target object based on the amount of image information corresponding to the target object in each of the first images; and adjusting the at least two second exposure parameters according to one of the first exposure parameters corresponding to the acquired first image.

13. The electronic device according to claim 10, wherein when the processor executes the operation of performing the content analysis on each of the first images, and determining the at least two second exposure parameters according to the obtained content analysis result and the at least two different first exposure parameters, the processor is further configured to execute following operations:

calculating an amount of image information corresponding to each of the first images to obtain the amount of image information corresponding to each of the first exposure parameters;

establishing a one-dimensional distribution map of brightness information in each of the first images; and determining the at least two second exposure parameters from the at least two first exposure parameters based on the amount of image information and the one-dimensional distribution map corresponding to each of the first exposure parameters.

14. The electronic device according to claim 10, wherein before the processor executes the operation of acquiring, by the first camera, the at least two first images by using the at least two different first exposure parameters, the processor is further configured to execute following operations:

acquiring a preview image by the second camera;

determining whether the preview image is a high light ratio image according to brightness distribution information of the preview image; and performing the operation of acquiring, by the first camera, the at least two first images by using the at least two different first exposure parameters if it is determined that the preview image is the high light ratio image.

15. The electronic device according to claim 10, wherein when the processor executes the operation of acquiring, by the first camera, the at least two first images by using the at least two different first exposure parameters, the processor is further configured to execute following operations:

acquiring at least two different preset first exposure parameters;

acquiring, by the first camera, the first images according to an order of the first exposure parameters from low to high;

detecting whether a target brightness value corresponding to the acquired first image exceeds a preset brightness value when each of the first images is acquired; and terminating the image acquisition operation of the first camera if the target brightness value of the acquired first image exceeds the preset brightness value.

16. The electronic device according to claim 15, wherein before the processor executes the operation of detecting whether the target brightness value corresponding to the acquired first image exceeds the preset brightness value, the processor is further configured to execute following operations:

determining the target brightness value according to at least one of an average photometry value, a center photometry value, and a spot photometry value corresponding to the first image.

17. The electronic device according to claim 10, wherein when the processor executes the operation of acquiring, by the first camera, the at least two first images by using the at least two different first exposure parameters, the processor is further configured to execute following operations:

acquiring a preset first exposure parameter;

acquiring, by the first camera, one first image with the first exposure parameter;

adjusting the first exposure parameter according to the first image corresponding to the first exposure parameter to obtain a first target exposure parameter if a target brightness value of the first image corresponding to the first exposure parameter is less than a preset brightness value;

serving the obtained first target exposure parameter as the first exposure parameter, and returning to perform the operation of acquiring, by the first camera, one first image with the first exposure parameter; and terminating the image acquisition operation of the first camera if the target brightness value of the first image corresponding to the first exposure parameter exceeds the preset brightness value.

18. A non-transitory computer-readable storage medium storing a computer program for execution by at least one processor of an electronic device, the computer program comprising sets of instructions for:

acquiring, by a first camera, at least two first images by using at least two different first exposure parameters;

performing a content analysis on each of the first images, and determining at least two second exposure parameters according to an obtained content analysis result and the at least two different first exposure parameters;

performing an image acquisition, by a second camera, with the at least two second exposure parameters to acquire at least two second images; and performing a fusion process on the at least two second images to obtain a target image;

wherein the computer program further comprises sets of instructions for, when operation of performing the content analysis on each of the first images, and determining the at least two second exposure parameters according to the obtained content analysis result and the at least two different first exposure parameters is executed:

calculating an amount of image information corresponding to each of the first images to obtain the amount of image information corresponding to each of the first exposure parameters;

establishing a two-dimensional distribution map of an image content in each of the first images, wherein the image content comprises at least one of brightness, color, and complexity of the first image; and determining the at least two second exposure parameters from the at least two first exposure parameters based on the amount of image information and the two-dimensional distribution map corresponding to each of the first exposure parameters.

* * * * *